United States Patent
Read

(10) Patent No.: US 7,469,232 B2
(45) Date of Patent: Dec. 23, 2008

(54) SYSTEM AND METHOD FOR REVENUE SHARING FOR MULTIMEDIA SHARING IN SOCIAL NETWORK

(75) Inventor: Christopher Jensen Read, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 11/651,871

(22) Filed: Jan. 10, 2007

(65) Prior Publication Data

US 2007/0112687 A1    May 17, 2007

(51) Int. Cl.
*G06F 17/60* (2006.01)
(52) U.S. Cl. .......................................... 705/64; 705/57
(58) Field of Classification Search .................. 705/64, 705/57
See application file for complete search history.

(56) References Cited

U.S. PATENT DOCUMENTS

| | | | | |
|---|---|---|---|---|
| 5,708,709 | A | 1/1998 | Rose | 705/59 |
| 5,784,460 | A | 7/1998 | Blumenthal et al. | 380/4 |
| 5,950,173 | A | 9/1999 | Perkowski | 705/26 |
| 6,009,525 | A | 12/1999 | Horstmann | 713/200 |
| 6,088,730 | A | 7/2000 | Kato et al. | 709/227 |
| 6,091,956 | A | 7/2000 | Hollenberg | 455/456 |
| 6,243,692 | B1 | 6/2001 | Floyd et al. | 705/59 |
| 6,363,356 | B1 | 3/2002 | Horstmann | 705/26 |
| 6,622,017 | B1 | 9/2003 | Hoffman | 455/419 |
| 6,832,230 | B1 | 12/2004 | Zilliacus et al. | 707/203 |
| 6,959,285 | B2 | 10/2005 | Stefanik et al. | 705/26 |
| 2001/0049636 | A1 | 12/2001 | Hudda et al. | 705/26 |
| 2001/0051903 | A1 | 12/2001 | Hansmann et al. | 705/26 |
| 2002/0002510 | A1 | 1/2002 | Sharp et al. | 705/26 |
| 2002/0010740 | A1 | 1/2002 | Kikuchi et al. | 709/203 |
| 2002/0010759 | A1 | 1/2002 | Hitson et al. | 709/219 |
| 2002/0026474 | A1 | 2/2002 | Wang et al. | 709/203 |
| 2002/0065778 | A1 | 5/2002 | Bouet et al. | 705/57 |
| 2002/0103833 | A1 | 8/2002 | Parry | 707/526 |
| 2002/0123971 | A1 | 9/2002 | Maritzen et al. | 705/64 |
| 2002/0128859 | A1 | 9/2002 | Perowski | 705/1 |
| 2002/0129170 | A1 | 9/2002 | Moore et al. | 709/249 |
| 2002/0169849 | A1 | 11/2002 | Schroath | 709/218 |
| 2003/0007464 | A1 | 1/2003 | Balani | 370/310 |

(Continued)

FOREIGN PATENT DOCUMENTS

FR    2 810 183 A1    12/2001

(Continued)

OTHER PUBLICATIONS

Article entitled: "nREACH'S "Mobile Content Kiosk™" to Debut at Los Angeles International Airport This September" Posted by WDN, Jul. 23, 2002, XP-002376572.

(Continued)

*Primary Examiner*—Pierre E Elisca
(74) *Attorney, Agent, or Firm*—John L. Rogitz

(57) ABSTRACT

When a person uses a first portable music player to wirelessly transmit a tune to a person with a second player in a social networking transaction for playing by the second player for a limited time, if the second person subsequently purchases an unrestricted version of the tune, the first person is compensated.

15 Claims, 1 Drawing Sheet

U.S. PATENT DOCUMENTS

| | | | |
|---|---|---|---|
| 2003/0074323 A1 | 4/2003 | Catyan | 705/59 |
| 2003/0110094 A1 | 6/2003 | Gulliver | 705/26 |
| 2003/0163382 A1 | 8/2003 | Stefanik et al. | 705/26 |
| 2003/0163551 A1 | 8/2003 | Riordan | 709/219 |
| 2004/0054597 A1 | 3/2004 | Gulliver | 705/64 |
| 2007/0112676 A1* | 5/2007 | Kontio et al. | 705/50 |
| 2007/0129005 A1* | 6/2007 | Goldberg et al. | 455/3.06 |
| 2007/0136608 A1 | 6/2007 | Kirovski et al. | 713/193 |

FOREIGN PATENT DOCUMENTS

| | | |
|---|---|---|
| FR | 2810183 A1 | 12/2001 |
| JP | 2006113595 A  * | 4/2006 |
| WO | WO 00/79818 A1 | 12/2000 |
| WO | WO 01/72064 A1 | 9/2001 |
| WO | WO 01/80133 A2 | 10/2001 |
| WO | WO 0180133 A2 | 10/2001 |
| WO | WO 01/89155 A1 | 11/2001 |
| WO | WO 02/15075 A1 | 2/2002 |
| WO | WO 02/15076 A1 | 2/2002 |
| WO | WO 0215075 A1 | 2/2002 |
| WO | WO 0215076 A1 | 2/2002 |

OTHER PUBLICATIONS

Website print out: www.zune.net.

* cited by examiner

SYSTEM AND METHOD FOR REVENUE SHARING FOR MULTIMEDIA SHARING IN SOCIAL NETWORK

FIELD OF THE INVENTION

The present invention relates generally to social sharing of multimedia.

BACKGROUND OF THE INVENTION

Portable media players have been provided that enable a person with a first player to wirelessly transmit a favorite tune to a person with a second player that is compatible with the first, promoting social interaction. Typically, the second player is permitted by means of software interlocks to play the tune only for a limited time, e.g., for three days, and/or only for a limited number of plays, e.g., three. Then, the second person must purchase the tune for his own player if he wants to keep playing it. Thus, the paradigm not only promotes social interaction but also sales of popular tunes.

The present invention understands that this paradigm can be improved to be even more compelling in terms of social interaction and sales generation.

SUMMARY OF THE INVENTION

A method is disclosed that includes transmitting, from a first portable multimedia player to a second portable multimedia player in a social transaction, a file representing multimedia. Also transmitted in the social transaction is identifying information of one of the players and/or its user. In one embodiment the identifying information is of the first player and is sent to the second player. In another embodiment the identifying information is of the second player and is sent to the first player. The method includes permitting the second player to play the file in accordance with a restriction paradigm, and if rights subsequently are purchased from a third entity, e.g., a server, in a commercial transaction to play the multimedia in a way that is less restricted than allowed by the restriction paradigm, the user of the first portable multimedia player is compensated using the identifying information. When the identifying information is of the first player and is received by the second player during the social transaction, the identifying information is supplied to the server by the second player during the commercial transaction. On the other hand, when the identifying information is of the second player and is received by the first player during the social transaction, the identifying information is supplied to the server by the first player.

In one non-limiting embodiment the identifying information is a token that is transferred from the first player to the second player with the multimedia file. The multimedia file may be wirelessly transmitted from the first player to the second player in a non-commercial transaction. The file can be an audio file or a computer game file or other multimedia file.

In some non-limiting implementations the second player receives rights for less restricted playing of the multimedia pursuant to a purchase using a wireless link direct from the second player to the Internet. In other non-limiting implementations the second player is connected to a personal computer communicating with a server on the Internet. If desired, if rights for less restricted playing of the multimedia are purchased, the identifying information may be removed from storage of the second player.

In another aspect, a file containing multimedia data is sent from a first multimedia player to a second multimedia player in a social transaction without consideration being remunerated to the first player or user thereof solely for the social transaction. Also, identifying information is sent between the players. Then, the second player is permitted to play the file in accordance with a restriction paradigm. As set forth further below, a user of the second player can purchase rights to play the multimedia data in a less restricted manner than permitted by the restriction paradigm, and only if rights to play the multimedia data in a less restricted manner are purchased, the first player and/or a user thereof is compensated using the identifying information.

In yet another aspect, a multimedia player includes a portable housing, a processor in the housing, and a data store in the housing and communicating with the processor for storing a multimedia file and identifying information that identifies a portable multimedia player from which the file was received. The player also has an output device for playing the file under control of the processor, which permits playing of the file in accordance with a restriction paradigm. The processor may be used to purchase rights to play multimedia represented by the file in a less restricted way than permitted by the restriction paradigm. If this is done, the processor causes the identifying information to be sent to a vendor computer.

In yet another aspect, the identity token exchanged between the media players is encrypted or obfuscated (e.g., scrambled or its location hidden) such that the users cannot be identified from the identity information except by a vendor of the content.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
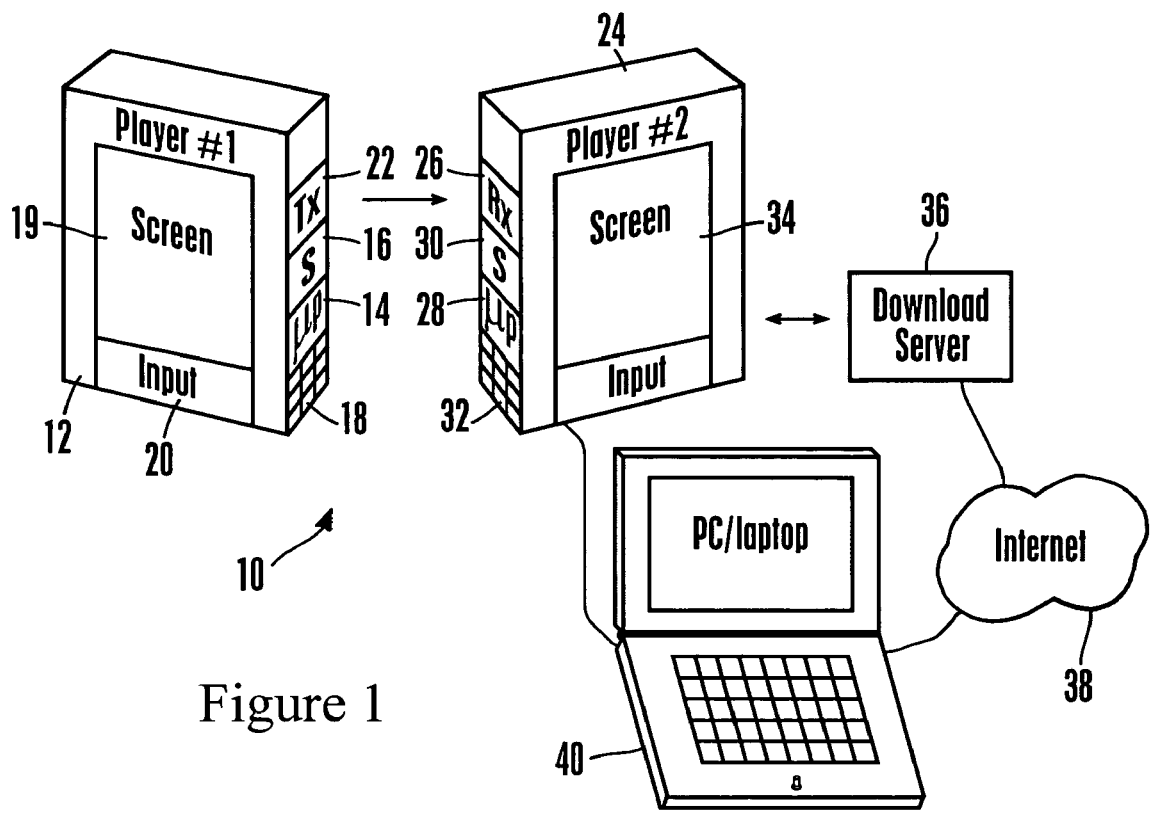
FIG. 1 is a block diagram of one non-limiting implementation of the architecture of the present invention.

Referring initially to FIG. 1, a system is shown, generally designated 10, that includes a first portable wireless multimedia player 12 that can include a processor 14 and a computer storage 16 that contains one or more multimedia files such as one or more of music files, video files, audio-video files, or computer game files that typically are purchased by a user of the first player 12 and stored for unrestricted play by the first player 12. Another use could be sharing a teaser trailer or only a segment of the desired content with the receiver purchasing a complete version of the content as discussed further below, so such teasers and partial content files can also be stored on the storage 16.

The storage 16 can also contain software executable by the processor 14 in accordance with principles set forth herein, as well as identifying information such as a software token, e.g., a number string, that indicates the identity of the player 12 and/or a user who is associated with the player 12, normally the end user-owner of the player 12. The storages disclosed herein may be without limitation flash memory, RAM, ROM, hard disk drives such as micro drives, floppy disk drives, CD drives, DVD drives, or removable media such as Sony Memory Stick® or SanDisk.

Because the player 12 is a multimedia player it has one or more output devices, including, without limitation, an audio speaker 18, in the case of a music player, and/or a video display 19 in the case of a music player (for displaying song titles and the like). In the case of a portable game console the video display 19 may display video games; in the case of a portable video player the display 19 may display video. The multimedia data that is displayed may be provided to the output devices 18, 19 by the processor 14. The player 12 may if desired also have one or more input devices 20 such as keypads, and/or the screen 19 may be a touchscreen. Other non-limiting input devices include pointing and clicking devices, etc. The input devices can be manipulated by a user to input data to the processor 14.

As shown in FIG. 1, the player 12 has communication capability, wired or more preferably wireless, and hence includes one or more wireless transceivers 22, labeled in FIG. 1 for ease of disclosure with the transmitter abbreviation "Tx." The transceiver 22 may employ any appropriate wireless transmission method including without limitation Bluetooth, infrared, sonic transmission, WiFi, "Flexnet", CDMA, GSM, other types of RF or IR, etc., including 802.11. Short range wireless transmission ordinarily but without limitation is employed, e.g., 802.11 or Bluetooth.

Under user control, the processor 14 of the first player 12 may use the wireless transceiver 22 to send multimedia files such as music tunes to a second player 24 that in all essential respects may be identical in configuration and operation to the first player 12 as shown and that is within range (typically within meters) of the first player 12. Accordingly, the second player 24 may include one or more transceivers 26, preferably wireless and labeled in FIG. 1 for ease of disclosure with the receiver abbreviation "Rx", for receiving the files from the first player 12. Also, as set forth further below in some implementations the first player 12 can send with the files information identifying the first player 12 and/or a user associated with the first player 12, typically the end user-owner. A timestamp indicating the date and time of the transfer may be provided as part of the identifying information. Alternatively, information identifying the second player 24 may be sent back to the first receiver 12 for storage thereof for purposes to be shortly disclosed. Under control of its own processor 28 the second player 24 stores the multimedia files (and in some embodiments the identifying information from the first player 12) on its own internal storage 30, for playback on output devices 32, 34 as appropriate.

In one non-limiting implementation the players 12, 24 are Sony Playstation™ portable game consoles that employ WiFi wireless communication principles to exchange video game files with each other. In another non-limiting implementation the players 12, 24 are Zune™ players made by Microsoft that employ 802.11 b/g communication principles with a range of about ten meters to exchange music tunes with each other. In still other non-limiting implementations the players 12, 24 may be personal digital assistants (PDAs) that can be appropriate laptop or hand-held computers, such as a Palm™ OS-based device, a Sony Clie™, or other personal digital assistant (PDA). Or, the players 12, 24 can be embodied in wireless telephones.

The system 10 further includes one or more download servers 36. The second player 24 may communicate directly with the server 36 over the Internet 38 using a wireless link to the Internet, i.e., the wireless transceiver 26 or other wireless transceiver of the second player 24 can be used to communicate with the Internet. Or, the second player 24 may be engaged with a laptop computer or personal computer 40 typically associated with the end user of the second player 24. The communication can be by means of, e.g., a universal serial bus (USB) link or other wired or wireless link, with the computer 40 communicating with the internet 38 and, hence, with the server 36 and thus functioning as a communication relay between the server 36 and second player 24.

Figure 2:
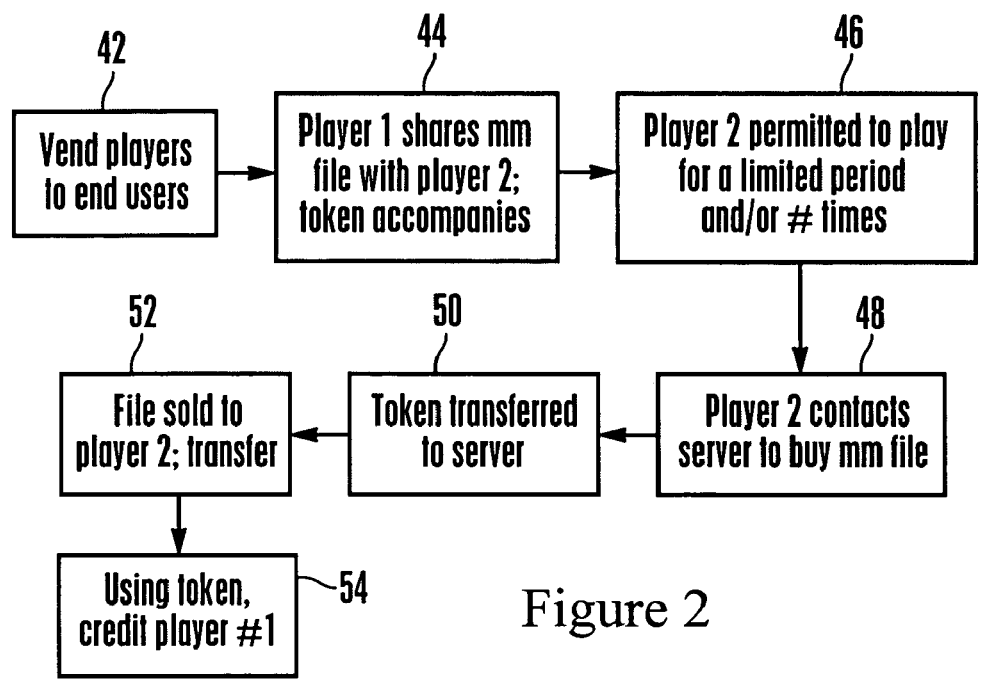
FIG. 2 is a flow chart of non-limiting logic in accordance with the present invention.

With the above illustrative non-limiting architecture in mind, attention is now directed to the logic shown in FIG. 2. Commencing at block 42, the players 12, 24 are vended or otherwise provided to their respective end users. Moving to block 44, the first player 12 may share a tune or teaser or other multimedia file stored in the storage 16 of the first player 12 with the second player 24 by wirelessly transmitting the file to the second player 24 under control of the user of the first player 12. This sharing is non-commercial in that the end users typically are sharing files in their capacities as individuals and not commercial entities, hence no consideration apart from social networking is exchanged in return for sending the file between the players. Also sent from the first player 12 to the second player 24 in some embodiments is the identifying information that identifies the first player 12 and/or the end user thereof. The identifying information and file may be stored on the storage 30 of the second player 24. In other embodiments the second player 24 sends information identifying itself to the first player 12 for storage at the first player 12.

Proceeding to block 46, software interlocks within the second player 24 typically permit the second player 24 to play the transferred file in accordance with a restriction paradigm such as only for a limited period, e.g., three days, and/or for a limited number of times, e.g., three. In the case of a teaser, the restriction paradigm is the fact of the teaser itself being only a partial version of a full multimedia content file such as a full movie. If the user of the second player 24 wishes to play the file more than what is allotted by the restriction paradigm, the user manipulates the input devices of the second player 24 at block 48 as appropriate to establish communication with the download server 36 to purchase from the download server 36 a less restricted (e.g., an unrestricted copy of the file or a full version of the content when a teaser of the content has been transferred, or equivalently a code or other data to permit less restricted, e.g., unrestricted, playing of the file received from the first player 12.) In either case, at block 48 the user of the second player 24 purchases rights to less restricted playing of the multimedia embodied in the file received from the first player 12 in the original social (non-commercial) sharing step at block 44.

As part of the purchase of rights for less restricted playing of the multimedia, at block 50 the second player 24 sends the data identifying the first player 12 (or equivalently its end user or owner) to the server 36. If desired, to conserve space the identifying information may be deleted or removed from the storage 30 of the second player 24 after being communicated to the server 36 or after being communicated to the computer 40 for purposes of future purchases.

Alternatively, at block 50 the ID of the second player 24 is sent to the first player 12, which stores the ID of the second player 24 along with an indication that the second player 24 received a particular file or files from the first receiver 12. In this non-limiting implementation the action at block 50 may occur any time between block 44 and block 54.

The transaction is consummated at block 52, wherein rights to play the multimedia in a way that is less restricted than permitted by the restriction paradigm are transferred to the second player 24 and the user of the second player 24 is billed accordingly.

As mentioned above, among the non-limiting ways to effect the transaction are to provide a new, unrestricted file of the multimedia to the second player 24 over the Internet, or to provide a full version of content when the original social transfer involved only a teaser, or to provide decryption keys or other tools to permit the second player 24 to re-enable playing of the file received from the first player 12, whose playing otherwise would be exhausted, absent the sale of additional rights, under the restriction paradigm.

In accordance with present principles, after consummating the transaction for less restricted playing of the multimedia by the second player 24, at block 54 the server 36 uses the identifying information to compensate the user of the first player 12. This compensation may take any number of non-limiting forms, including, e.g., cash payments, credits toward future purchases, bonus points toward a goal, etc. The amount of compensation may be based in part on the timestamp portion of the identifying information, e.g., purchasing rights to less restricted playing of multimedia soon after the multimedia was received in the social transaction at block 44 may result in greater compensation to the user of the first player 12 than if rights to less restricted playing of multimedia are purchased relatively long after the multimedia was received in the social transaction at block 44.

In a first embodiment the server 36 receives the information representing the first player 12 from the second player 24 as part of the transaction with the second player 24 to provide it with a less restricted version of the multimedia. Also, recall that in a second embodiment the second player 24 can provide the first player 12 with the ID of the second player 24 during the social transaction at block 44. In this case the first player 12 must upload to the server 36 the ID information from any players to which it has socially transferred files periodically to cause the server to check to see if the first player 12 is entitled to compensation for any sales related to the uploaded information. Or, the first player 12 may upload to the server 36 the ID information from a recipient player in response a message from the recipient player indicating that a commercial transaction related to the earlier social transaction at block 44 has taken place.

In one non-limiting embodiment, the identifying information can be included in an access code that might be generated by combining a first player 12 identification with an end user identification and, if desired, with the timestamp information.

While the particular SYSTEM AND METHOD FOR REVENUE SHARING FOR MULTIMEDIA SHARING IN SOCIAL NETWORK is herein shown and described in detail, it is to be understood that the subject matter which is encompassed by the present invention is limited only by the claims.

What is claimed is:

1. A method comprising:
    transmitting, from a first portable multimedia player to a second portable multimedia player, at least one file including multimedia, the file being stored in a storage of the first player and being wirelessly transmitted to the second player under control of a user of the first player to thereby share the file, the sharing being non-commercial in that respective users of the players share files in individual capacities and not as commercial entities such that no consideration apart from social networking is exchanged in return for sending the file between the players;
    permitting the second player to play the file in accordance with a restriction paradigm; and
    only if rights subsequently are purchased to play multimedia represented by the file on the second player in a way that is less restricted than allowed by the restriction paradigm, compensating a user of the first portable multimedia player at least in part using identifying information representing an identification of the first player and/or a user thereof.

2. The method of claim 1, wherein the identifying information is at least one token transferred from the first player to the second player with the file.

3. The method of claim 1, wherein the file is an audio file.

4. The method of claim 1, wherein the file is a computer game file.

5. The method of claim 1, wherein the second player receives rights for less restricted playing of the multimedia pursuant to a purchase using a wireless link direct from the second player to the Internet.

6. The method of claim 1, wherein the second player is connected to a personal computer communicating with a server on the Internet.

7. The method of claim 1, wherein the identifying information is encrypted or obfuscated.

8. A method comprising:
    sending at least one file containing multimedia data from a first multimedia player to a second multimedia player in a social transaction without consideration being remunerated to the first player or user thereof for the social transaction;
    sending from the first player to the second player identifying information associated with the first player but not with the second player, and/or sending from the second player to the first player identifying information associated with the second player but not with the first player;
    permitting the second player to play the file in accordance with a restriction paradigm; and
    permitting a user of the second player to purchase rights to play multimedia data represented by the file in a less restricted manner than permitted by the restriction paradigm, and only if rights to play the multimedia data in a less restricted manner are purchased, compensating the first player and/or a user thereof using the identifying information, wherein the file is stored in a storage of the first player and is wirelessly transmitted o the second player under control of a user of the first player to thereby share the file, the sharing being non-commercial in that respective users of the players share files in individual capacities and not as commercial entities such that no consideration apart from social networking is exchanged in return for sending the file between the players, such that the purchase of rights to play multimedia represented by the file is the only commercial transaction.

9. The method of claim 8, wherein the file is sent wirelessly from the first player to the second player.

10. The method of claim 8, wherein the file is an audio file.

11. The method of claim 8, wherein the file is a computer game file.

12. The method of claim 8, comprising sending from the first player to the second player identifying information associated with the first player but not with the second player, the second player sending the information to a server to facilitate the compensating act.

13. The method of claim 8, comprising sending from the second player to the first player identifying information associated with the second player but not with the first player, the first player sending the information to a server to facilitate the compensating act.

14. The method of claim 8, wherein if rights for less restricted playing of the multimedia are purchased, the identifying information is removed from storage of the second player.

15. The method of claim 8, wherein the identifying information is encrypted or obfuscated.

\* \* \* \* \*